United States Patent
Jansen et al.

(10) Patent No.: US 9,541,638 B2
(45) Date of Patent: Jan. 10, 2017

(54) MIMO RADAR SYSTEM

(71) Applicant: NXP B.V., Eindhoven (NL)

(72) Inventors: Feike Guus Jansen, Eindhoven (NL); Alessio Filippi, Eindhoven (NL); Zoran Zivkovic, Eindhoven (NL)

(73) Assignee: NXP B.V., Eindhoven (NL)

( * ) Notice: Subject to any disclaimer, the term of this patent is extended or adjusted under 35 U.S.C. 154(b) by 172 days.

(21) Appl. No.: 14/538,541

(22) Filed: Nov. 11, 2014

(65) Prior Publication Data

US 2016/0131752 A1   May 12, 2016

(51) Int. Cl.
| | | |
|---|---|---|
| G01S 13/04 | (2006.01) | |
| G01S 7/02 | (2006.01) | |
| G01S 13/42 | (2006.01) | |
| G01S 13/34 | (2006.01) | |
| G01S 13/87 | (2006.01) | |
| G01S 13/58 | (2006.01) | |
| G01S 7/28 | (2006.01) | |
| G01S 7/35 | (2006.01) | |

(52) U.S. Cl.
CPC ............. *G01S 13/42* (2013.01); *G01S 13/343* (2013.01); *G01S 13/582* (2013.01); *G01S 13/584* (2013.01); *G01S 13/878* (2013.01); *G01S 7/02* (2013.01); *G01S 7/28* (2013.01); *G01S 2007/356* (2013.01)

(58) Field of Classification Search
CPC ............. G01S 7/02; G01S 7/28; G01S 13/343
USPC .......................................................... 342/27
See application file for complete search history.

(56) References Cited

U.S. PATENT DOCUMENTS

| | | | | |
|---|---|---|---|---|
| 2002/0122502 A1* | 9/2002 | El-Gamal | ............. | H04L 1/0618 |
| | | | | 375/267 |
| 2010/0156701 A1 | 6/2010 | Shirakawa | | |
| 2012/0001791 A1* | 1/2012 | Wintermantel | ......... | G01S 7/023 |
| | | | | 342/109 |

FOREIGN PATENT DOCUMENTS

| | | |
|---|---|---|
| CN | 103149564 A | 6/2013 |
| CN | 103823217 A | 5/2014 |

OTHER PUBLICATIONS

Guetlein-Holzer Johanna et al. "Comparison of motion compensation methods applied to a TDM FMCW MIMO radar system", 2014 International Radar Conference, IEEE, Oct. 13, 2014 (Oct. 13, 2014), pp. 1-6, XP032746315.*

(Continued)

*Primary Examiner* — Peter Bythrow
*Assistant Examiner* — Helena Seraydaryan

(57) ABSTRACT

Various exemplary embodiments relate to a method for detecting an object using radar system having M transmit antennas, N receive antennas, and a processor, including: receiving, by the processor, N×M digital signals, wherein the N receivers receive M received signals corresponding to M sequences of encoded transmitted signals resulting in N×M digital signals; processing the N×M digital signals to produce N×M first range/relative velocity matrices; applying a phase compensation to N×(M−1) first range/relative velocity matrices to compensate for a difference in range between the N×(M−1) first range/relative velocity matrices and the Mth range/velocity matrix; decoding the M phase compensated range/relative velocity matrices for the N receivers using an inverse of the transmit encoding to produce M decoded phase range/relative velocity matrices for the N receivers; detecting objects using the M range/relative velocity matrices for the N receivers to produce a detection vector.

20 Claims, 11 Drawing Sheets

(56) References Cited

OTHER PUBLICATIONS

Kees, et al., "Improvement of Angular Resolution of a Milimeterwave Imaging System by Transmitter Location Multiplexing", 1995 IEEE Microwave Systems Conference, 105-108.
Schmid, "Motion Compensation and Efficient Array Design for TDMA FMCW MIMO Radar Systems".
Stove, "Linear FMCW Radar Techniques", IEE Proceedings-F, vol. 139, No. 5, Oct. 1992.
Extended European Search Report for Patent Appln. No. 15193813.1 (Mar. 31, 2016).
Feger R et al: "A 77-GHz FMCW MIMO Radar Based on an SiGe Single-Chip Transceiver", IEEE Transactions on Microwave Theory and Techniques, IEEE Service Center, Piscataway, NJ, US, vol. 57, No. 5, May 1, 2009 (May 1, 2009), pp. 1020-1035.
Guetlein-Holzer Johanna et al: "Comparison of motion compensation methods applied to a TOM FMCW MIMO radar system", 2014 International Radar Conference, IEEE, Oct. 13, 2014 (Oct. 13, 2014), pp. 1-6, XP032746315.

* cited by examiner

MIMO RADAR SYSTEM

TECHNICAL FIELD

Various exemplary embodiments disclosed herein relate generally to CDMA base MIMO radar systems.

Radar systems may be used to detect the range and velocity of nearby targets. With various advances in technology, radar systems may now be applied in many different applications. For example, automotive radar systems are seen as crucial to increasing road safety.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various embodiments described herein relate to a method for detecting an object using radar system having M transmit antennas, N receive antennas, and a processor, including: receiving, by the processor, N×M digital signals, wherein the N receivers receive M received signals corresponding to M sequences of encoded transmitted signals resulting in N×M digital signals; processing the N×M digital signals to produce N×M first range/relative velocity matrices; applying a phase compensation to N×(M−1) first range/relative velocity matrices to compensate for a difference in range between the N×(M−1) first range/relative velocity matrices and the Mth range/velocity matrix; decoding the M phase compensated range/relative velocity matrices for the N receivers using an inverse of the transmit encoding to produce M decoded phase range/relative velocity matrices for the N receivers; detecting objects using the M range/relative velocity matrices for the N receivers to produce a detection vector.

Various embodiments described herein relate to a radar system including: M transmit antennas; N receive antennas; a waveform generator configured to produce a transmit signal including a sequence of waveforms; a signal encoder encoding the transmit signal using a transmit encoding to produce M sequences of encoded transmit signals; a N receivers including: a downconverter configured to downconvert a received signal to produce a downconverted signal wherein the received signal corresponds to the M sequences of encoded transmitted signals; and an analog to digital converter configured to convert the downconverted signal to a digital signal; a digital signal processor configured to: receive N×M digital signals, wherein the N receivers receive M received signals corresponding to M sequences of encoded transmitted signals resulting in N×M digital signals; process the N×M digital signals to produce N×M first range/relative velocity matrices; apply a phase compensation to N×(M−1) first range/relative velocity matrices to compensate for a difference in range between the N×(M−1) first range/relative velocity matrices and the Mth range/velocity matrix; decode the M phase compensated range/relative velocity matrices for the N receivers using an inverse of the transmit encoding to produce M decoded phase range/relative velocity matrices for the N receivers; detect objects using the M range/relative velocity matrices for the N receivers to produce a detection vector.

Various embodiments described herein relate to a non-transitory machine-readable storage medium encoded with instructions for execution by a radar system having M transmit antennas and N receive antennas for detecting an object, the medium including: instructions for receiving N×M digital signals, wherein the N receivers receive M received signals corresponding to M sequences of encoded transmitted signals resulting in N×M digital signals; instructions for processing the N×M digital signals to produce N×M first range/relative velocity matrices; instructions for applying a phase compensation to N×(M−1) first range/relative velocity matrices to compensate for a difference in range between the N×(M−1) first range/relative velocity matrices and the Mth range/velocity matrix; instructions for decoding the M phase compensated range/relative velocity matrices for the N receivers using an inverse of the transmit encoding to produce M decoded phase range/relative velocity matrices for the N receivers; and instructions for detecting objects using the M range/relative velocity matrices for the N receivers to produce a detection vector.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure or substantially the same or similar function.

DETAILED DESCRIPTION

The description and drawings presented herein illustrate various principles. It will be appreciated that those skilled in the art will be able to devise various arrangements that, although not explicitly described or shown herein, embody these principles and are included within the scope of this disclosure. As used herein, the term, "or," as used herein, refers to a non-exclusive or (i.e., and/or), unless otherwise indicated (e.g., "or else" or "or in the alternative"). Additionally, the various embodiments described herein are not necessarily mutually exclusive and may be combined to produce additional embodiments that incorporate the principles described herein.

Automotive radar systems are seen as crucial to increasing road safety. In such an application, it is desired that the radar system detect reflecting objects in its field of view, measure unambiguously the distance to each of the detected objects, measure unambiguously the relative radial velocity of each of the detected objects, and measure with high resolution the angle of arrival of the reflected radar signal of each of the detected objects.

Automotive radar systems may experience two undesired situations. In the first situation, the relative radial velocity of detected reflectors with high absolute relative radial velocity is misinterpreted resulting in velocity ambiguity. In the second situation, the angle of arrival estimation in multiple input multiple output systems is distorted due moving reflectors resulting in angle measurement errors. While an automotive radar is discussed herein, it is noted that the various teachings of the embodiments described below may be applied to radar systems used in other applications.

In radar systems a signal, modulated according to a specific waveform principle, may be transmitted at a certain carrier frequency (e.g., 79 GHz). The reflected signals may be downconverted to baseband signals by an analog receiver and processed by a digital part of the system. In these processing steps the distance to an object, the relative radial velocity, and angle of arrival (AOA) between the object and the radar are calculated.

A frequency modulated continuous wave (FMCW) is a suitable waveform for automotive radar systems due to its accuracy and robustness. A radar implementation transmitting a sequence of short duration frequency chirps has beneficial properties with respect to the detection of objects moving with a non-zero relative radial velocity.

Figure 1:
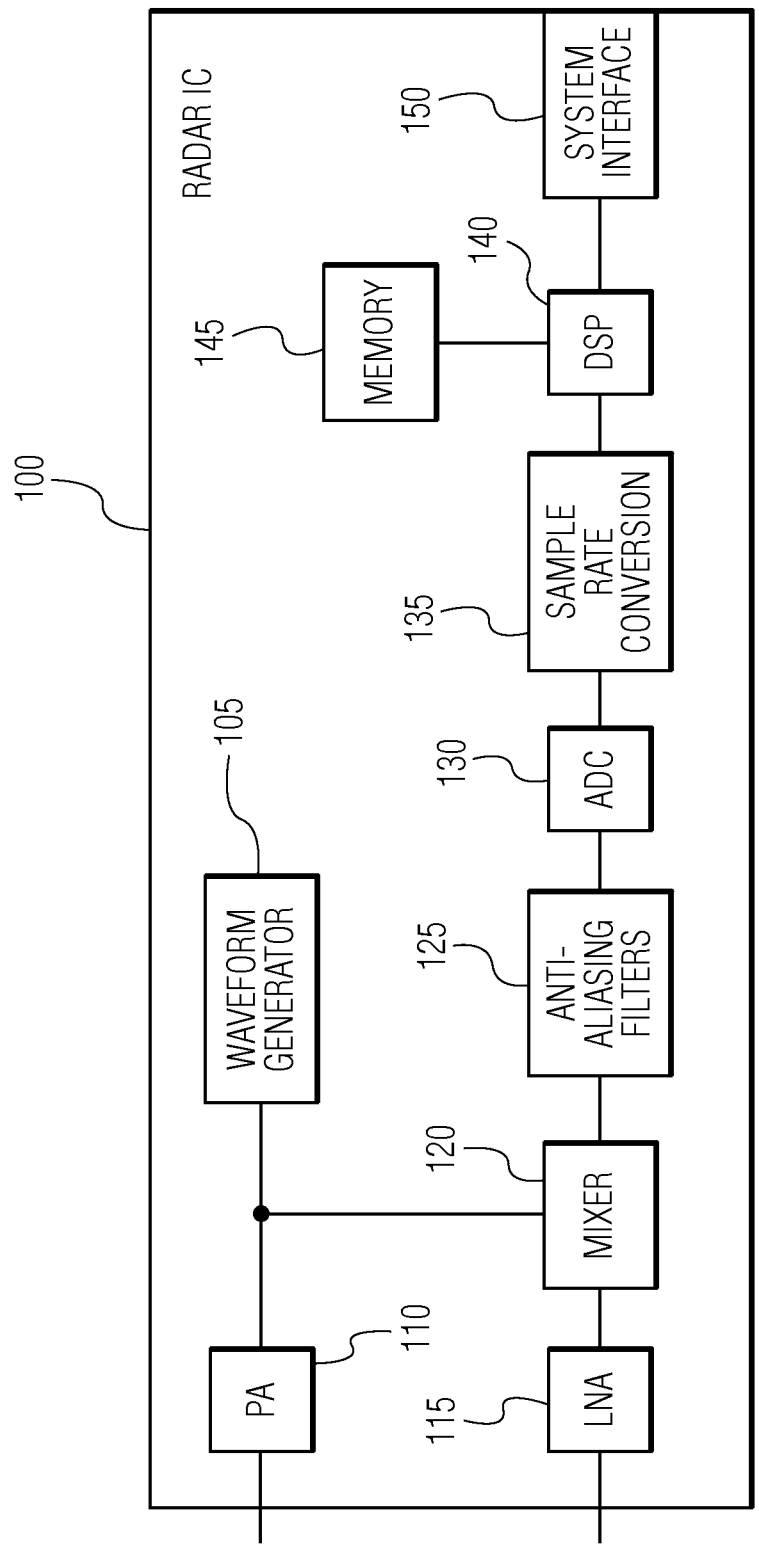
FIG. 1 illustrates a functional diagram of an embodiment of a FMCW radar system.

FIG. 1 illustrates a functional diagram of an embodiment of a FMCW radar system. The signal that is received is delayed in time with respect to the transmitted signal. The time delay is due to the propagation time between the radar system and the reflecting object in the outward and return direction. The radar system 100 may include a waveform generator 105, a power amplifier 110, a low noise amplifier (LNA) 115, a mixer 120, anti-aliasing filters 125, an analog-to-digital converter (ADC) 130, a sample rate convertor 135, a digital signal processor (DSP) 140, memory 145, and a system interface 150. The waveform generator 105 generates a continuous wave signal with a frequency chirp. The PA 110 receives and amplifies the frequency chirped continuous wave signal. This signal may then be radiated by a transmit antenna (not shown) in order to detect objects. A reflected signal may be received by a receive antenna (not shown). The LNA 115 receives the reflected signal from the receive antenna and amplifies it. The mixer 120 then receives the amplified received signal and mixes it with the current transmit waveform generated by the waveform generator 105. The anti-aliasing filters 125 then filters the mixed signal. The ADC 130 then samples and converts the filtered mixed signal to a digital signal. The sample rate converter 135 may then convert the sample rate of the digital signal to another sample rate. This will be described in greater detail below. The DSP 140 then processes the received digital signals to produce various desired measurements of detected objects such as range, relative radial velocity, and angle of arrival (AOA). The memory 145 provides memory to the DSP 140 to use in order to process the received digital signals. The system interface 150 provides an external interface that may be used to supply measurement information to other systems. The radar system 100 may be implemented on a single integrated circuit (IC). It may also be implemented as a combination of ICs.

The operation of the radar system 100 illustrated in FIG. 1 and the signal processing used to detect objects will now be described. In an FMCW system, a sine wave with a linearly increasing is transmitted:

$$s(t) = \exp\left(j2\pi f_c t + j\pi \frac{\Delta f}{T_{ramp}} t^2 + j\varphi\right), \quad (1)$$

where $f_c$ is the carrier frequency, t is the running time, $\Delta f$ is the frequency deviation of the chirp, $T_{ramp}$ is the time duration of the chirp in which the frequency increases and $\varphi$ is the initial phase of the transmitted signal. Other embodiments may use a decreasing frequency chirp instead.

Figure 2:
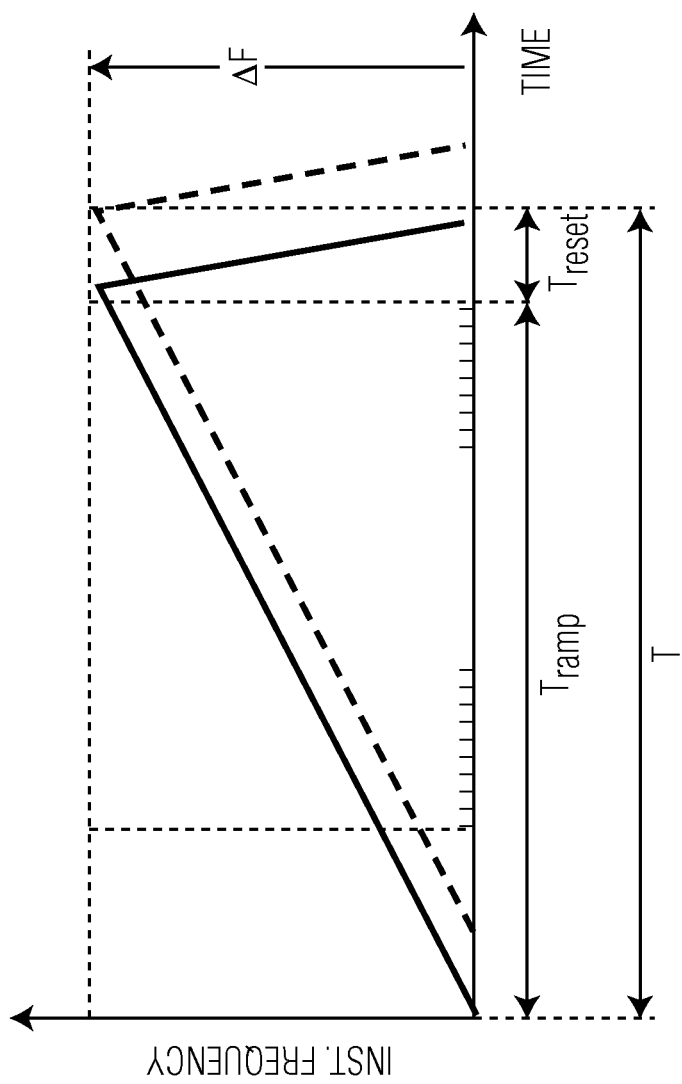
FIG. 2 illustrates an example of FMCW waveform signal.

FIG. 2 illustrates an example of FMCW waveform signal. The signal has a period of T. During a first time period $T_{ramp}$, the frequency of the transmit waveform is increased linearly for a total frequency change of $\Delta F$. Finally, during a third time period $T_{reset}$ the frequency of the transmit signal is quickly reduced back to the carrier frequency. Accordingly, $T=T_{ramp}+T_{reset}$.

In the down conversion operation, the mixer 120 mixes the current transmit signal produced by the waveform generator 105 with the time delayed received signal. This delayed received signal for a single reflecting object is illustrated in FIG. 2 by the dotted line waveform. When the relative velocity between the radar system 100 and the reflecting object is zero, the received signal is a time delayed signal, attenuated, and phase rotated version of the transmitted signal.

The result of the down conversion operation is a sine wave oscillating at the so-called beat frequency referred to as a beat signal which has a beat frequency based upon the frequency difference between the transmit signal and the receive signal. If K reflectors are present in the view of the radar, the received signal is:

$$r(t) = \sum_{k=0}^{K-1} A_k \exp\left(-j2\pi f_c \tau_k(t) - j2\pi \frac{\Delta f}{T} \tau_k(t) t + j2\pi \frac{\Delta f}{T} \tau_k(t)^2\right), \quad (2)$$

where $A_k$ and $\tau_k(t)$ are the amplitude and the (time dependent) time of flight of the $k^{th}$ reflector respectively. Note that the frequency component having a frequency of twice the carrier frequency is filtered out.

This beat frequency depends on the distance D to the reflecting object the difference between the start and the stop frequency of the ramp $\Delta f$, and the duration of the ramp $T_{ramp}$:

$$f_{beat} = \frac{\Delta F}{T_{ramp}} \frac{2D}{c_0}, \quad (3)$$

Where $c_0$ is equal to the speed of light. When multiple reflectors are visible to the radar, the beat signal will be a summation of sine waves oscillating at their respective beat frequencies having an amplitude based upon the radar cross section and distance of the reflector.

The DSP 140 processes the received signals to estimate the magnitude of the oscillation frequencies. Therefore, after the ADC 130 samples and quantizes the signal, the DSP 140 may use a Fast Fourier Transformation (FFT) to estimate the oscillating frequency. The frequency at which the samples are taken by the ADC 130 is $f_{adc}$. According to the sampling theorem the maximum frequency that can be represented by the digital signal is the Nyquist frequency equal to half of $f_{adc}$ for real valued samples. Reflecting objects at large distances may have beat frequencies exceeding half of $f_{adc}$. As a result, their position in the frequency spectrum is ambiguous, e.g., it is the position in the baseband spectrum plus an unknown integer multiple of $f_{adc}$.

In some cases the far-away reflectors are not of interest. To prevent this undesired aliasing, anti-aliasing filters 125 may be used. These filters strongly attenuate the frequency components exceeding the Nyquist frequency of $f_{adc}/2$. The anti-aliasing filters may be realized as a combination of analog and digital filters. Other implementations of anti-aliasing filters may be used as well.

When the relative velocity is non-zero, the corresponding Doppler frequency is added to the beat frequency. The Doppler frequency can be calculated by:

$$f_{Doppler} = \frac{2Vf_c}{c_0}. \quad (4)$$

For automotive radar systems with $f_c$=79 GHz and a relative radial velocity of V=300 km/h then $f_{Doppler} \approx 44$ kHz.

However the duration of the chirp may be very short, for example 100 µs, and the frequency deviation may be, for example, at least several tens of MHz. As a result the magnitude of the Doppler frequency is very small compared to the magnitude of the beat frequency and may be ignored in the calculation of the distance.

The effect of the Doppler frequency shift is more pronounced on the phase of the beat signal. The increase (or decrease) of the phase of the received signal from chirp to chirp in radians is given by:

$$\phi_{Doppler} = 2\pi f_{Doppler} T; \quad (5)$$

$$T = T_{ramp} + T_{dwell} + T_{reset}. \quad (6)$$

Figure 3:
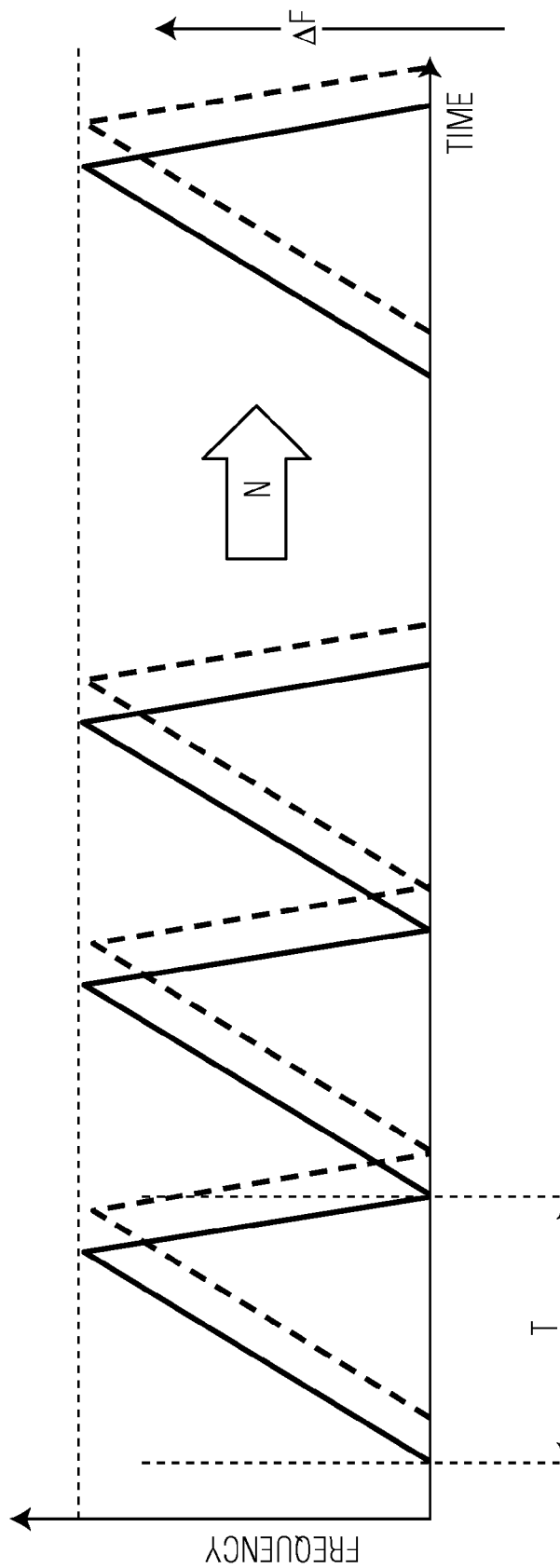
FIG. 3 illustrates such a sequence of N chirps.

The evolution of this phase may be measured by using a sequence of FMCW chirps. FIG. 3 illustrates such a sequence of N chirps.

Figure 4:
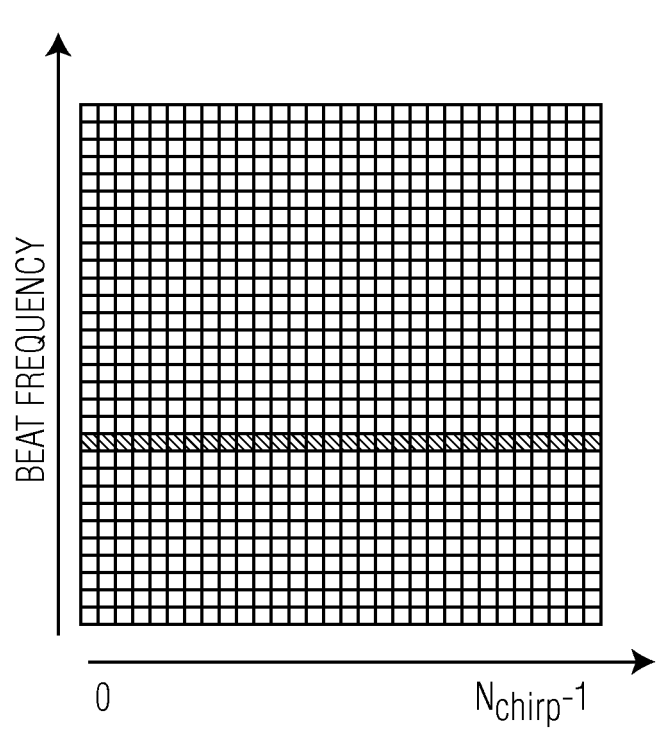
FIG. 4 illustrates the two FFT steps of the calculation of a two dimensional FFT.
Figure 4:
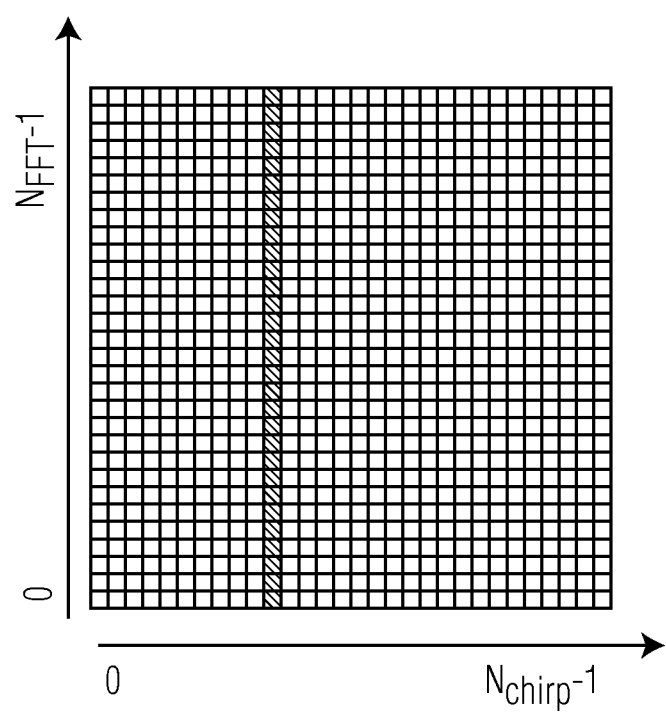

A two dimensional FFT may be used to calculate the relative radial velocity to the reflector along with the range of the reflector. FIG. 4 illustrates the two FFT steps of the calculation of a two dimensional FFT. The DSP 140 may calculate an FFT on the set of data samples corresponding to each transmitted FMCW chirp in the sequence of FMCW chirps. Each row in step 1 corresponds to one of the FMCW chirps in the sequence. Each resulting frequency sample of the FFT corresponds to a specific received beat frequency and hence a range, resulting in a series of range gates.

Once all of the FMCW chirps in the sequence have been received and processed using an FFT, the DSP 140 may then in a second step, perform an FFT on data samples in the columns. This second FFT determines the contribution of the Doppler effect on the frequency of the received signal due to any relative velocity between the radar system 100 and the reflector.

However when $\phi_{Doppler}$ exceeds $\pi$, the velocity measurement will be ambiguous. The Doppler component is sampled with a sampling frequency equal to:

$$F_{s,Doppler} = T^{-1}.$$

Therefore the absolute maximum relative velocity that can be measured unambiguously is limited by the total duration of a single chirp.

Figure 5:
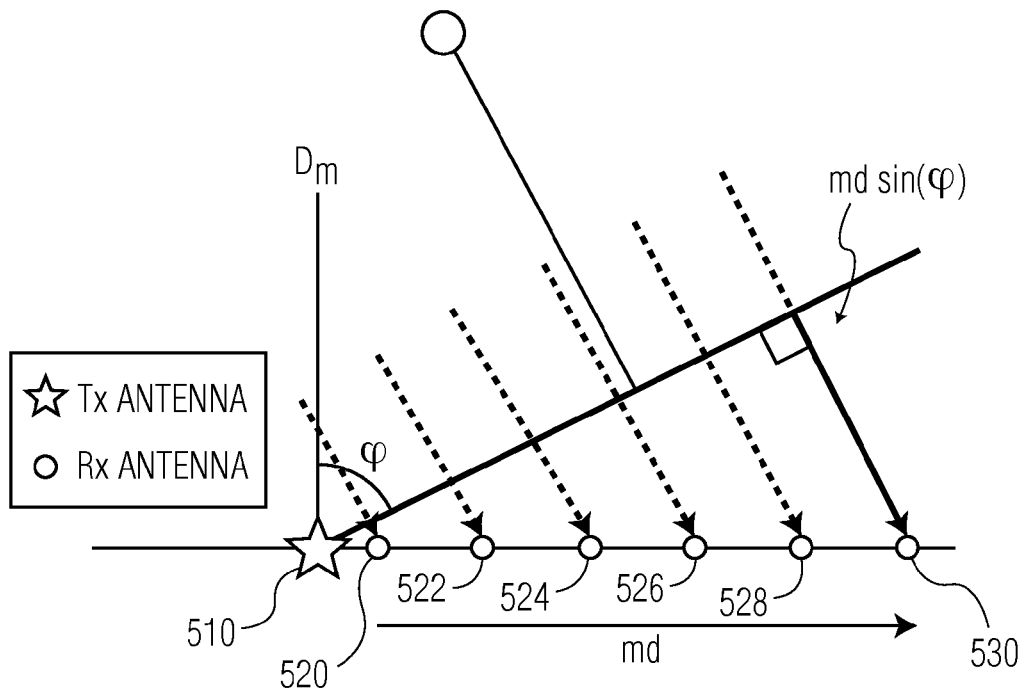
FIG. 5 illustrates the use of a transmit antenna along with a number of receive antennas to estimate the angle of arrival.

FIG. 5 illustrates the use of a transmit antenna along with a number of receive antennas to estimate the angle of arrival. The transmit antenna 510 transmits the radar signal. Multiple receive antennas 520-530 each receive a reflected radar signal from a reflector. Each receive antenna 520-530 may be connected to an RF receiver and analog to digital converter. Therefore for each received antenna signal a 2D spectrum such as in FIG. 4 may be calculated. The phase relation (due to unequal time of flight) between the signal located at equal row and column indices in these 2D matrices is given by the angle of arrival, the carrier frequency and relative location of the receiving antennas.

A vector may be constructed of the samples in the 2D matrices with equal row and column indices, where the order of the samples follows the same order in which they are physically placed. The AOA may then, for example, be estimated by performing a Fourier transformation of this sample vector. The index at which the power of the Fourier transformed signal reaches its maximum corresponds to the AOA. Other known techniques may also be used to estimate the AOA.

Figure 6:
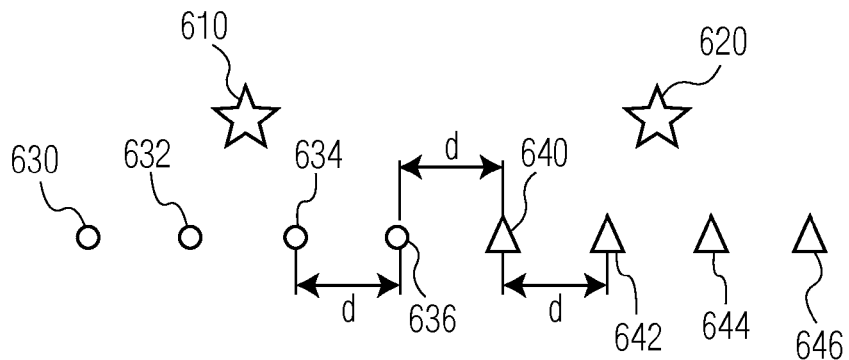
FIG. 6 illustrates an arrangement of two transmit antennas and four receive antennas.

The accuracy of the angle of arrival measurement may be increased by the use of multiple transmit antennas as well as multiple receive antennas. This is known as multiple input multiple output (MIMO) radar. In a MIMO radar, a virtual array is formed with antennas positioned at the convolution of the transmitter and receiver array manifold. FIG. 6 illustrates an arrangement of two transmit antennas and four receive antennas. The receive antennas 630, 632, 634, and 636 may be positioned with equal spacing, e.g., half a wavelength at the carrier frequency, between them to allow for unambiguous measurements. As shown in this example, the transmit antennas 610 and 620 are spaced apart by 2 wavelengths. For stationary reflectors the forward path length depends on the position of the transmitter and the reflector. The backward path length depends on the position of the receiver and the reflector. Therefore the total path is changed when a transmitting antenna at a different position is used. This difference in path length is used to create a so-called virtual array that includes uniformly spaced virtual elements. These virtual elements 640, 642, 644, and 646 are shown in FIG. 6.

Figure 7:
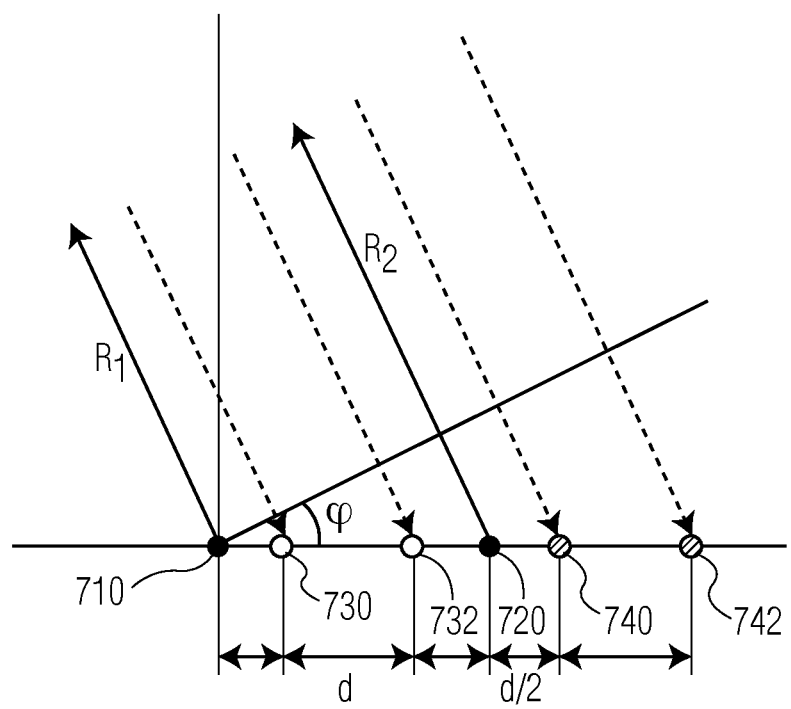
FIG. 7 illustrates the location of the virtual receive antennas in a system with two transmit antennas and two receive antenna.

FIG. 7 illustrates the location of the virtual receive antennas in a system with two transmit antennas and two receive antennas. In FIG. 7, an object is located at an angle $\phi$ relative to a face of the radar antenna. The two transmit antennas 710 and 720 are separated by a distance 2d, where d is equal to have half the wavelength at the carrier frequency. The two receive antennas 730 and 732 are separated by d and centered between the two transmit antennas 710 and 720 as shown. The distance between the transmit antenna 710 and the detected object is $R_1$. The distance between the transmit antenna 720 and the detected object is $R_2$. So a signal transmitted from the transmit antenna 720 and received by the by the receive antennas 730 and 732 appear to have the same location as the virtual receive antennas 740 and 742. This allows for the MIMO radar to have a larger apparent antenna aperture that results in a more accurate angle measurement.

In the AOA estimation approach described above the resolution and accuracy of the AOA estimation depend on the number of receivers. To construct the virtual array the signal emitted by the plurality of transmitters are separated at the receiver side. In order to separate the signals at the receiving side the transmitted signals may be orthogonal.

Figure 8:
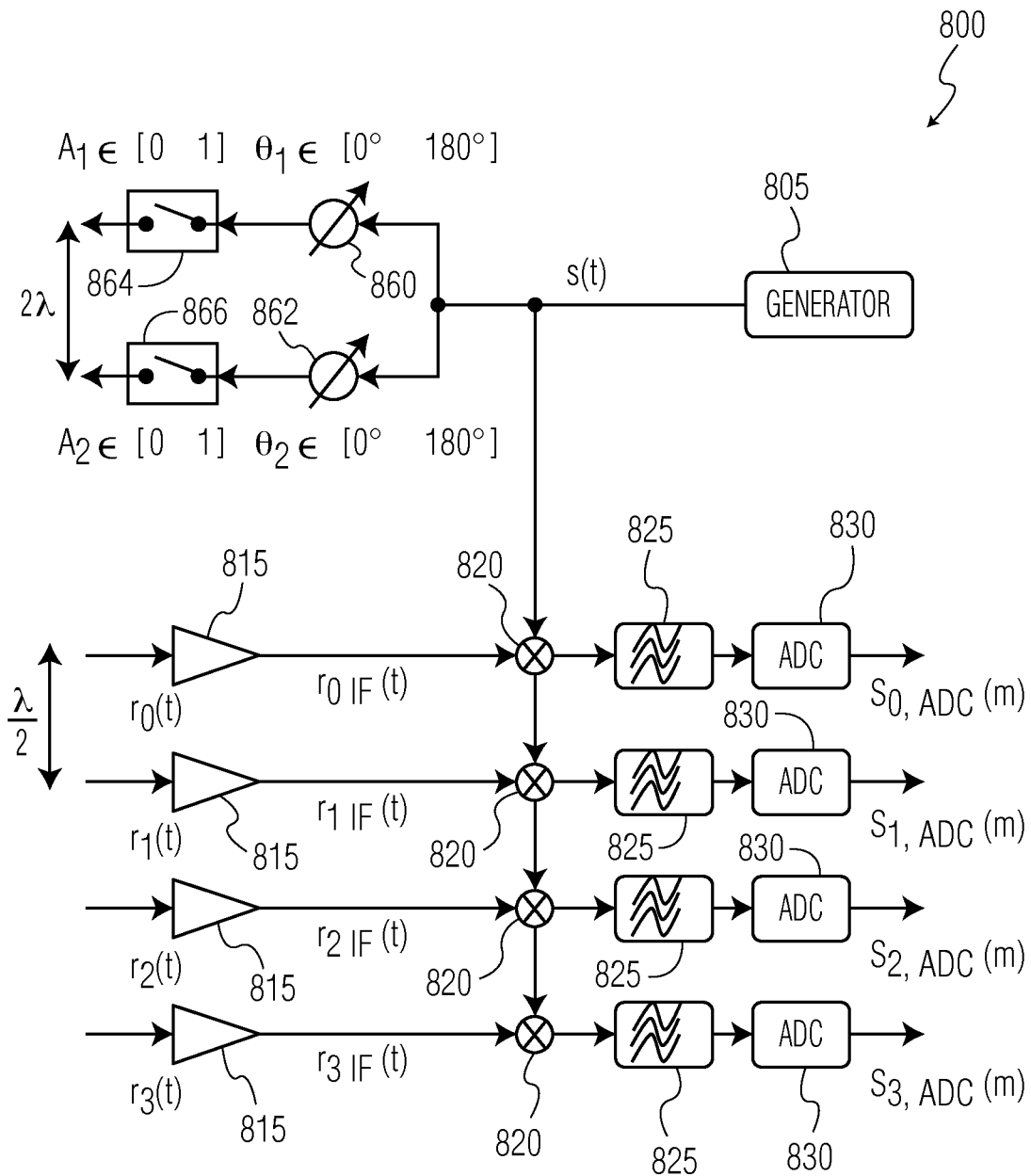
FIG. 8 illustrates a radar system with two transmit antennas and four receive antenna using orthogonal transmit signals.

One way to orthogonalize the transmitted signals is by applying a phase shift or a gain term to the transmitted signal using a signal encoder. FIG. 8 illustrates a radar system with two transmit antennas and four receive antenna using orthogonal transmit signals. The radar system 800 may include a waveform generator 805 that operates as described above. The first phase shifter 860 and first switch 864 are connected to a first transmit antenna (not shown). The first phase shifter 860 and first switch 864 may be a first signal encoder. The first phase shifter 860 may apply a phase shift to the generated waveform and the first switch 864 may determine whether the signal is transmitted or not. The second phase shifter 862 and second switch 866 operate in a similar manner. The second phase shifter 862 and second switch 866 may be a second signal encoder. The radar system 800 has four receive antennas with associated receive channels. Each receive channel includes a LNA 815, a mixer 820, an anti-aliasing filter 825, and an ADC 830. Each of these receive channels operates as described above with respect to FIG. 1. Further, the first and second signal encoders may also be considered to be a single signal encoder.

Figure 9:
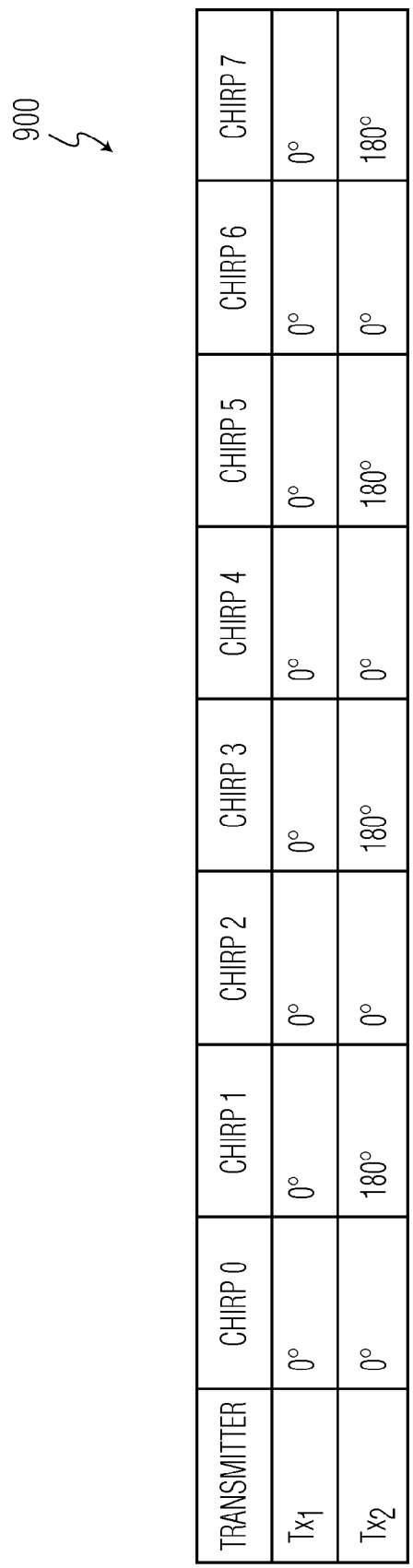
FIG. 9 illustrates a table containing a sequence of applied phase shifts.

The transmission of orthogonal signals will now be described. By changing the applied phase shift applied by the first and second phase shifters 860 and 862, a code matrix may be constructed. For example the phase shift may be changed at the start of each transmitted chirp. FIG. 9 illustrates a table containing a sequence of applied phase shifts. The coding matrix 900 is for a system with two transmitters and a sequence of 8 chirp signals. The coding matrix is a 2×2 matrix and is applied four times.

The signal seen by the receiving antennas is a summation of the reflection of the two transmitted signals. After mixing the received signal with the original transmitted signal the intermediate frequency (IF) signal is obtained as follows:

$$r_{IF}(t) = A \sum_{n=0}^{N-1} A_n \exp\left(-j2\pi f_c \tau_n(t) - j2\pi \frac{\Delta f}{T} \tau_n(t) t + j2\pi \frac{\Delta f}{T} \tau_n^2(t) + j\theta_n\right), \quad (7)$$

$$\tau_n(t) = \tau_0 + \frac{d_n \sin(\theta)}{c_0} + \frac{2tV}{c_0} = \tau_n + \frac{2tV}{c_0} + \Delta\tau_n. \quad (8)$$

Here a linear array of N transmit antennas with equal spacing between the antennas of half the carrier wavelength is assumed and $d_n$ is the position of the $n^{th}$ transmitter on the x-axis, $\theta_n$ and $A_n$ are the phase shift and gain term applied to the $n^{th}$ transmitter respectively, A is a term representing the received signal amplitude, and V is velocity. In the radar system 800 $d_n$ is on the order of a few wavelengths therefore the increase in beat frequency or beat phase is negligible. As a consequence equation 7 may be approximated by:

$$r_{IF}(t) \approx \quad (9)$$
$$A \exp\left(-j2\pi\left\{f_c\left(\tau_0 + \frac{2tV}{c_0}\right) + \frac{\Delta f}{T}\left(\tau_0 + \frac{2tV}{c_0}\right)t - \frac{\Delta f}{T}\left(\tau_0 + \frac{2tV}{c_0}\right)^2\right\}\right)$$
$$\sum_{n=0}^{N-1} A_n \exp(j\theta_n - j2\pi f_c \Delta\tau_n)$$

From equation 9 it is clear that for certain combinations of phase shifts the signal arriving at a certain angle of arrival may be completely cancelled. For example in a 2 transmitter system with a reflector positioned along the normal of the antenna array the path length to the reflector from each of the transmitters will be equal meaning that $\Delta\tau_n=0$. If a phase shift of 180 degrees in one transmitted signal and zero degrees in the other transmitted signal is applied the summation in equation 9 will be zero. This spatial filtering effect will result in an amplitude modulation of the received chirp signals. This amplitude modulation will distort the 2D spectrum making it impossible to indentify two distinct spectral peaks in the Doppler spectrum. Therefore the transmitter signal cannot be separated for certain angles of arrival. An alternative signal processing technique is required. This technique is explained below.

Figure 10:
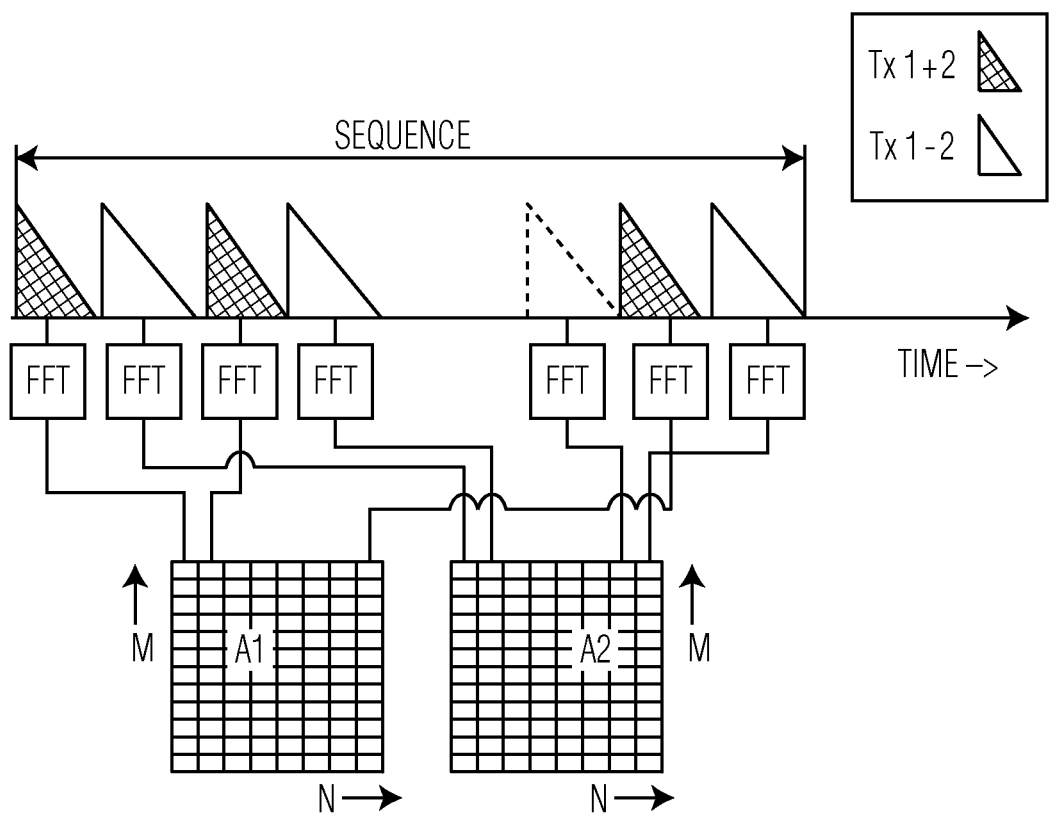
FIG. 10 illustrates the 2D FFT processing of two received signals.

At the receiver side the signal $r_{IF}(t)$ is digitized generating $s_{ADC}(mt_{sample})$, for readability $t_{sample}=F_s^{-1}$ will dropped in following derivation. The received sequence of length L is divided in Q (number of transmit antennas) subsets with each subset containing $N_c$ sequences of length M. Here the division is done before calculating the second round of the 2D FFT calculation. The division into Q subsets is done in such a way that each subset only contains signals that were transmitted according to the same transmitter configuration. An example for L=192, Q=2, $N_c$=8 and M=12 is depicted in FIG. 10. FIG. 10 illustrates the 2D FFT processing of two received signals.

For each of the Q subsets the 2D FFT is calculated. In a system with 2 transmitters and 4 receivers in total 8 2D FFT matrices are calculated. From FIG. 10 is clear that A1 and A2 contain samples that were not taken at the same moment in time. The samples from A2 are taken T seconds later than the samples from A1. This forms a problem in case the reflector is non-stationary. During this T seconds the reflector moves which in(de)creases the path length and consequently the phase of the received signal. This phase distortion needs to be corrected. A correction table of length 1×Nc is pre-calculated and stored in the on chip memory. The entries of the correction table form a de-rotation of the phase shift that a reflector moving at velocity V during the duration of the chirp T will receive for a signal emitted at carrier frequency $f_c$. These phase de-rotation values for subset q can be calculated as follows:

$$c_{corr,q}(1, n_c) = \exp\left(-j2\pi \frac{2qTf_c}{c_0} V(n_c)\right) \quad (10)$$
$$= \exp\left(-j2\pi \frac{2qTf_c}{c_0} \frac{c_0}{2Tf_c} \frac{n_c}{N_c}\right)$$
$$= \exp\left(-j2\pi \frac{n_c}{N_c} q\right),$$

with $$n_c = -\frac{N_c}{2} \quad -\frac{N_c}{2}+1 \quad \cdots \quad \frac{N_c}{2}-2 \quad \frac{N_c}{2}-1$$

and with $q = 0 \quad q \quad \cdots \quad Q-2 \quad Q-1$.

The phase correction may be applied by element multiplication of each row by the correction table where each row is the Doppler spectrum associated with a specific range gate. It is not required to know the specific relative velocity of a reflector. Rather, the specific phase de-rotation may be calculated based upon the used carrier frequency and time duration of the waveform. Furthermore the de-rotation is applied to all or part of the received samples.

After the correction, all subsets Q may be aligned in time and the signal separation step may be executed. The system selects Q samples with equal indices from the corrected 2D spectra of the first receiver. The Q samples are collected in a vector where the ordering follows the ordering of the columns in the coding matrix. Next this vector may be multiplied by the inverse of the coding matrix. Suppose the following 3×3 coding matrix has been used to generate S for the 3 transmitter case:

$$C = \begin{bmatrix} 1 & 1 & 1 \\ 1 & -1 & 1 \\ 1 & 1 & -1 \end{bmatrix}$$

$$S = [t1 \ t2 \ t3] \begin{bmatrix} 1 & 1 & 1 \\ 1 & -1 & 1 \\ 1 & 1 & -1 \end{bmatrix}$$

$$= [t1+t2+t3 \ \ t1-t2+t3 \ \ t1+t2-t3]$$

Here t1, t2 and t3 simply indicate the signals transmitted by the three transmitters. Then the following matrix may be used to separate the signals:

$$C^H(C^H C)^{-1} = \frac{1}{2}\begin{bmatrix} 0 & 1 & 1 \\ 1 & -1 & 0 \\ 1 & 0 & -1 \end{bmatrix}$$

$$[t1+t2+t3 \ \ t1-t2+t3 \ \ t1+t2-t3]\frac{1}{2}\begin{bmatrix} 0 & 1 & 1 \\ 1 & -1 & 0 \\ 1 & 0 & -1 \end{bmatrix} =$$

$$\frac{1}{2}\begin{bmatrix} t1-t2+t3+t1+t2-t3 \\ t1+t2+t3-t1+t2-t3 \\ t1+t2+t3-t1-t2+t3 \end{bmatrix}^T = [t1 \ t2 \ t3]$$

The result of this operation is a set of Q samples where each sample corresponds to a single transmitting antenna.

After executing this step for all receiver antennas a sample vector may be formed that contains as many samples as the product of the number of transmitters and receivers. The samples are ordered according to their position in the virtual array. The ordered sample vector is now ready for angle of arrival estimation or further processing. In one implementation, the sample vector may be multiplied by a Hamming window and processed by a FFT operation. The resulting angular spectrum may then be used to detect reflectors and estimate their angle of arrival.

Another embodiment will now be described. The use of the described coding and related processing techniques results in an increase of the effective duration of the waveform. The increase of the waveform duration is linear with the number of transmitting antennas that are used, e.g. the rank of the coding matrix. The extended waveform duration leads to a decrease of the maximum Doppler frequency that may be unambiguously measured.

Figure 11:
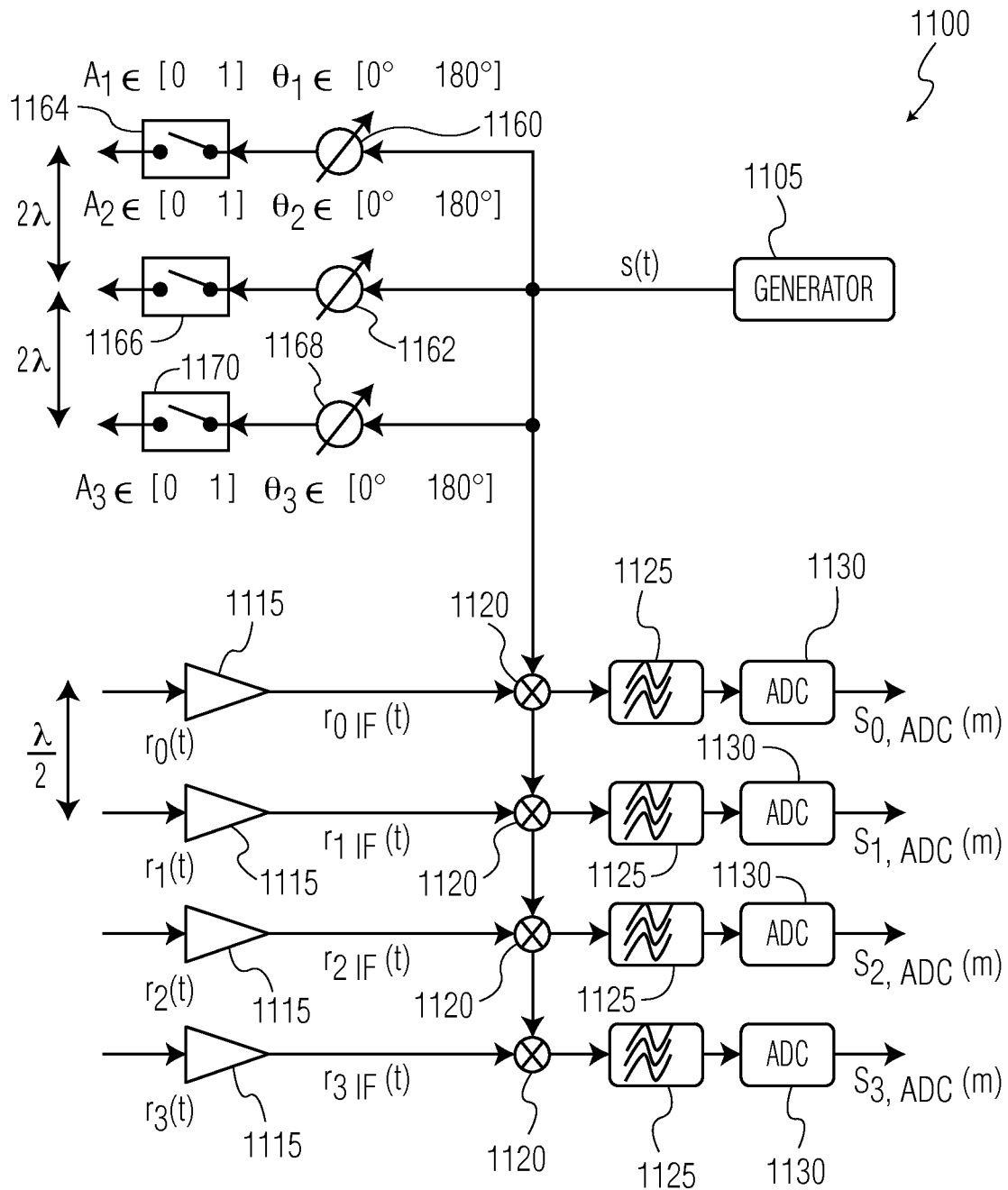
FIG. 11 illustrates a radar system with three transmit antennas and four receive antenna using orthogonal transmit signals.

A large decrease in maximum Doppler frequency is not desired, as aliasing Doppler spectra can start overlapping and may result in complicating a correct detection of the reflector. This embodiment offers a trade-off between the decrease maximum measurable Doppler frequency and the number of transmit antennas that are used. In FIG. 11 the two transmitter radar system of FIG. 8 is extended to a three transmitter system. FIG. 11 illustrates a radar system with three transmit antennas and four receive antennas using orthogonal transmit signals.

The radar system 1100 includes a waveform generator 1105 that operates as described above. A first phase shifter 1160 and first switch 1164 are connected to a first transmit antenna (not shown). The first phase shifter 1160 and first switch 1164 may be a first signal encoder. The first phase shifter 1160 may apply a phase shift to the generated waveform and the first switch 1164 may determine whether the signal is transmitted or not. A second phase shifter 1162, second switch 1166, third phase shifter 1168, and third switch 1170 operate in a similar manner. The phase shifters and switches may be a signal encoders. The radar system 1100 has four receive antennas with associated receive channels. Each receive channel includes a LNA 1115, a mixer 1120, an anti-aliasing filter 1125, and an ADC 1130. Each of these receive channels operates as described above with respect to FIG. 1.

Figure 12:
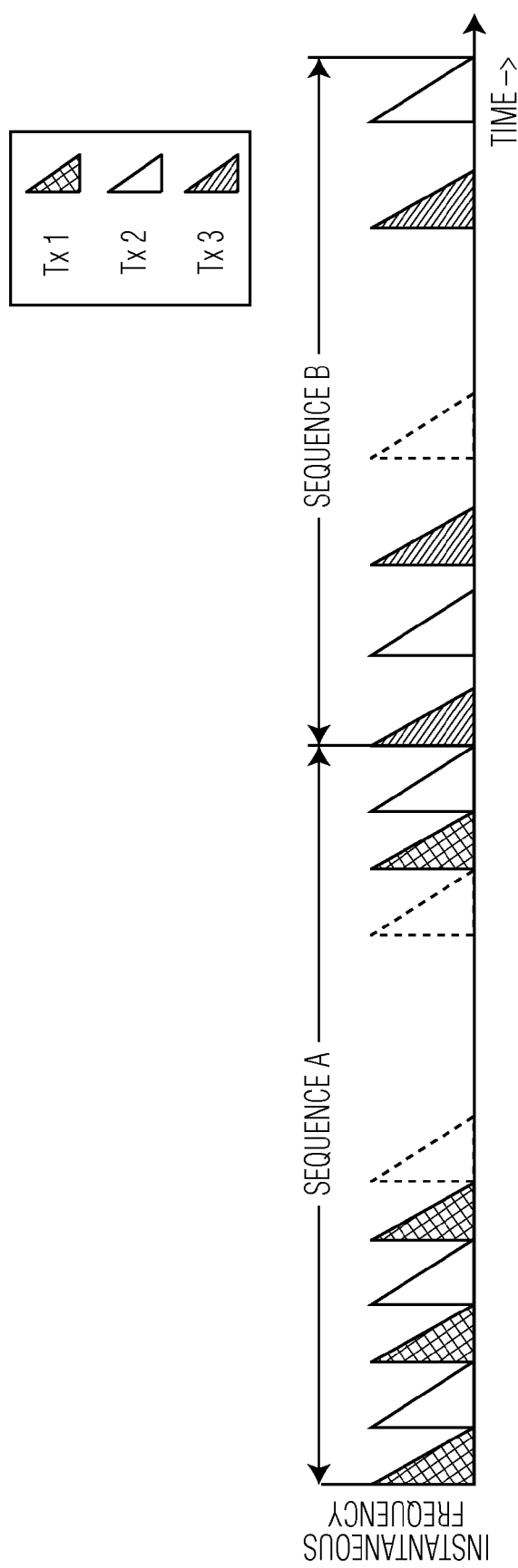
FIG. 12 illustrates the transmission scheme associated with the radar system in FIG. 11.

FIG. 12 illustrates the transmission scheme associated with the radar system in FIG. 11. FIG. 12 shows a three transmit antenna transmission scheme where each triangle represent a chirp waveform. The filling of the triangle indicates the transmitter that has been used to emit the chirp waveform. In this example TDMA encoding has been used.

In the transmission scheme two or more measurements are executed. The measurements differ in waveform duration and/or a different bandwidth. Due to these differences the aliased responses may be resolved resulting in an unambiguous measurement.

Different transmit antennas may be used in different measurements. However, in non-stationary environments the response of the reflector changes over time. This change in response will corrupt the linear phase relationship in the phased array radar configuration. To solve this undesired change a system with virtual reference antennas may be used. Virtual reference antennas may have virtual antenna array elements that overlap in the spatial domain. In this embodiment the antennas overlap in the time domain.

In FIG. 12 Tx2 is used in both measurements and serves as a reference. Tx1 and Tx3 are used in sequence 1 and 2 respectively. The reason to use Tx2 twice is that over time the reflector response changes. Because Tx2 is used twice, the radar system 1100 may remove the changes in the reflector response.

The processing of both measurements follows the steps described in the embodiment above. Therefore four signals from the three transmitters are obtained. In these four transmitter signals, transmitter Tx2 is presented twice, once in measurement A and once in measurement B. Then the following virtual steering vector may be created:

$$\Psi_A(u,m)=[A1_1(u,m)A1_2(u,m)\Phi(m)A2_1(u,m)\Phi(m)A2_2(u,m)\Gamma(m)B1_1(u,m)\Gamma(m)B1_2(u,m)]$$

Where $\Phi(m)=c_{corr,q}(1 \ m)$ and $\Gamma$ is a correction factor based upon the inner product between $A2_p$ and $B2_p$ with p representing the index of the receiver antenna and $A1_1$ is the sample originating from transmitter 1 in the A measurement that is received by the receiving antenna with index p=1. The virtual steering vector can then be used to estimate the AOA based upon 12 antennas. $\Gamma$ may be calculated as follows:

$$\Gamma = \sum_{p=1}^{P} P \frac{|A2_p|}{|B2_p|} \frac{A2_p(B2_p)^H}{|A2_p(B2_p)^H|}$$

The virtual steering vector can then be used to estimate the AOA based upon 12 antennas.

In this embodiment and in each measurement, two transmit antennas are used while the angle of arrival may be calculated using three transmitter antennas. Therefore the reduction of the maximum unambiguous Doppler frequency is ½. If in each measurement, three transmit antennas were used, the reduction would have been ⅓. Therefore the chance of overlapping Doppler spectra is smaller with this embodiment while the angular resolution is equal to a system using three transmitting antennas in each measurement. It is also noted that any other coding matrix which is full rank may be used.

The embodiments described above overcome three problems. First, techniques to emit orthogonal radar signals from a plurality of transmitters are often expensive as they require complex hardware such as ADCs with high sampling speed or multiple oscillators. Second, object displacement during transmission may corrupt the linear phase relationship that is essential to multiple transmitter, multiple receiver angle of arrival estimation. Third, the use of multiple transmitters with MIMO coding lowers the maximum unambiguous Doppler frequency that the system can measure.

The embodiments described above include various features to overcome these problems. The embodiments describe a radar system and signal processing method enabling the use of multiple, simultaneously transmitting antennas and a plurality of simultaneously receiving antennas for high resolution angle of arrival estimation in zero and non-zero relative radial velocity scenarios.

The embodiments further describe the transmission of a sequence of subsequences using a plurality of transmitters according to a full rank coding matrix. Each sub-sequence includes as many waveforms as there are transmitters with each waveform emitted by one or more modulated transmitters according to the column of the coding matrix. The coding matrix describes the state of the transmitters including relative phase and amplitude.

The embodiments further describe a receiver signal processing technique in which the received signal is divided into sets of sequences. The sampled signal sequences in each set correspond to the same column index of the coding-matrix with which they have been transmitted. Each set is processed to produce a two-dimensional signal matrix in which each matrix entry corresponds to a spatial distance and a Doppler frequency.

The embodiments further describe phase correcting all sample matrices for object displacement during the time offset with which they have been transmitted. The phase correction of each spatial distance and Doppler frequency combination is based upon the corresponding sampled Doppler frequency and the separation in time between the transmission of the coding column under consideration and the transmission of the column vector which is taken as a reference.

The embodiments further describe a matrix transformation that is applied to a vector of displacement corrected samples with equal spatial distance and Doppler frequency index of all 2D matrices. The transformation consists of multiplying the vector with the mentioned samples by the matrix inverse of the coding matrix.

The embodiments further describe a transmission scheme in which multiple measurements are performed using different transmit antennas and in which at least one transmit antenna is re-used in another measurement with the goal of creating a reference antenna in time in such a way that long time reflector response changes can be corrected.

The embodiments further describe a radar system in which the virtual steering vector is further processed to produce an angle of arrival estimate and/or forms the input of an object detection algorithm.

The embodiments described above use an FMCW radar as an example. The techniques described with respects to these embodiments may also be used for other types of radar, for example, pulsed radars. In the case of a pulsed radar, time of arrive of the signal is used to form range gates and then an FFT may be performed to resolve Doppler. This would result in the same range/Doppler matrix that results from the 2D FFT on the received FMCW waveform. Then the same techniques may be applied to the pulsed radar range/Doppler matrix to Multiple transmitting antennas can be used to improve the angular resolution of the radar using a low cost coding technique for signals emitted by a plurality of transmitters where the plurality of transmitters can be separated at the receiver side.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor, for example DSP above, to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:
1. A radar system comprising:
M transmit antennas;
N receive antennas;
a waveform generator configured to produce a transmit signal including a sequence of waveforms;
a signal encoder encoding the transmit signal using a transmit encoding to produce M sequences of encoded transmit signals;
a N receivers comprising:
a downconverter configured to downconvert a received signal to produce a downconverted signal wherein the received signal corresponds to the M sequences of encoded transmitted signals; and
an analog to digital converter configured to convert the downconverted signal to a digital signal;
a digital signal processor configured to:
receive N×M digital signals, wherein the N receivers receive M received signals corresponding to M sequences of encoded transmitted signals resulting in N×M digital signals;
process the N×M digital signals to produce N×M first range/relative velocity matrices;
apply a phase compensation to N×(M−1) first range/relative velocity matrices to compensate for a difference in range between the N×(M−1) first range/relative velocity matrices and the Mth range/velocity matrix;
decode the M phase compensated range/relative velocity matrices for the N receivers using an inverse of the transmit encoding to produce M decoded phase range/relative velocity matrices for the N receivers;
detect objects using the M range/relative velocity matrices for the N receivers to produce a detection vector;
wherein the phase compensation is calculated independent of the velocity of the detected objects.

2. The radar system of claim 1, wherein the magnitude of the phase correction depends on the velocity index and a time constant.

3. The radar system of claim 1, wherein the digital signal processor is further configured to calculate the AOA of the detected object.

4. The radar system of claim 1, wherein:
the transmit signal is a frequency modulated continuous wave (FMCW) signal including a sequence of frequency chirped waveforms;
downconverting the first transmit signal includes mixing the transmit signal with a received signal; and
producing the N×M range/relative velocity matrices includes performing a two dimensional fast Fourier transform (FFT) on the N×M digital signals wherein the FFT in a first direction corresponds to range and the FFT in a second direction corresponds to relative velocity.

5. The radar system of claim 1, wherein:
the transmit signal is a pulsed radar signal including a sequence waveforms having a pulse repetition frequency (PRF); and
producing the N×M first range/relative velocity matrices includes performing range gating on the N×M digital signals and a fast Fourier transform (FFT) on the N×M digital signals.

6. The radar system of claim 1, wherein encoding the transmit signal includes:
producing a first encoded transmit sequence including signals transmitted by a first antenna and a second antenna; and
producing a second encoded transmit sequence including signals transmitted by a first antenna and a third antenna.

7. The radar system of claim 6, wherein the digital signal processor is further configured to compensate for changes in the detections using the two different received signals from the first antenna.

8. The radar system of claim 1, wherein detecting an object includes using a constant false alarm rate detector.

9. The radar system of claim 1, wherein the transmit encoding includes a full rank encoding matrix.

10. A method for detecting an object using radar system having M transmit antennas, N receive antennas, and a processor, comprising:
receiving, by the processor, N×M digital signals, wherein the N receivers receive M received signals corresponding to M sequences of encoded transmitted signals resulting in N×M digital signals;
processing the N×M digital signals to produce N×M first range/relative velocity matrices;
applying a phase compensation to N×(M−1) first range/relative velocity matrices to compensate for a difference in range between the N×(M−1) first range/relative velocity matrices and the Mth range/velocity matrix;
decoding the M phase compensated range/relative velocity matrices for the N receivers using an inverse of the transmit encoding to produce M decoded phase range/relative velocity matrices for the N receivers; and
detecting objects using the M range/relative velocity matrices for the N receivers to produce a detection vector;
wherein the phase compensation is calculated independent of the velocity of the detected objects.

11. The method of claim 10, wherein the magnitude of the phase correction depends on the velocity index and a time constant.

12. The method of claim 11, further comprising calculating the AOA of the detected object.

13. The method of claim 10, further comprising:
downconverting N×M received signals to produce N×M downconverted signals wherein the received signals correspond to the M sequences of encoded transmitted signals; and
an analog to digital converter configured to convert the N×M downconverted signals to N×M digital signals.

14. The method of claim 13 further comprising:
generating the transmit signal including a sequence of waveforms; and
encoding the transmit signal using a transmit encoding to produce M sequences of encoded transmit signals.

15. The method of claim 14 wherein:
the transmit signal is a frequency modulated continuous wave (FMCW) signal including a sequence of frequency chirped waveforms;
downconverting the first transmit signal includes mixing the transmit signal with a received signal; and
producing the N×M range/relative velocity matrices includes performing multiple two dimensional fast Fourier transforms (FFT) on the N×M digital signals wherein the FFT in a first direction corresponds to range and the FFT in a second direction corresponds to relative velocity.

16. The method of claim 14, wherein:
the transmit signal is a pulsed radar signal including a sequence waveforms having a pulse repetition frequency (PRF); and
producing the N×M first range/relative velocity matrices includes performing range gating on the N×M digital signals and a fast Fourier transform (FFT) on the N×M digital signals.

17. The method of claim 14, wherein the transmit encoding includes a full rank encoding matrix.

18. The method of claim 14, wherein encoding the transmit signal includes:
producing a first encoded transmit sequence including signals transmitted by a first antenna and a second antenna; and producing a second encoded transmit sequence including signals transmitted by a first antenna and a third antenna.

19. The method of claim 18, further comprising compensating for changes in the detections using the two different received signals from the first antenna.

20. A non-transitory machine-readable storage medium encoded with instructions for execution by a radar system having M transmit antennas and N receive antennas for detecting an object, the medium comprising:

instructions for receiving N×M digital signals, wherein the N receivers receive M received signals corresponding to M sequences of encoded transmitted signals resulting in N×M digital signals;

instructions for processing the N×M digital signals to produce N×M first range/relative velocity matrices;

instructions for applying a phase compensation to N×(M−1) first range/relative velocity matrices to compensate for a difference in range between the N×(M−1) first range/relative velocity matrices and the Mth range/velocity matrix;

instructions for decoding the M phase compensated range/relative velocity matrices for the N receivers using an inverse of the transmit encoding to produce M decoded phase range/relative velocity matrices for the N receivers; and instructions for detecting objects using the M range/relative velocity matrices for the N receivers to produce a detection vector;

wherein the phase compensation is calculated independent of the velocity of the detected objects.

* * * * *